United States Patent
Totani et al.

[11] Patent Number: 5,979,931
[45] Date of Patent: Nov. 9, 1999

[54] AIR BAG COVER

[75] Inventors: Chiharu Totani, Gifu; Shigehiro Ueno; Tetsuya Fujii, both of Aichi; Kenichi Furuta, Gifu, all of Japan

[73] Assignee: Toyoda Gosei Co., Ltd., Aichi, Japan

[21] Appl. No.: 08/764,026

[22] Filed: Dec. 11, 1996

[30] Foreign Application Priority Data

Dec. 12, 1995 [JP] Japan ................................ 7-323303

[51] Int. Cl.⁶ .................................................. B60R 21/16
[52] U.S. Cl. ........................ 280/728.3; 280/731; 280/732; 280/743.1
[58] Field of Search ............................ 280/728.3, 728.1, 280/731, 732, 743.1

[56] References Cited

U.S. PATENT DOCUMENTS

| | | | |
|---|---|---|---|
| 5,544,912 | 8/1996 | Sommer | 280/728.3 |
| 5,611,564 | 3/1997 | Bauer | 280/728.3 |
| 5,632,914 | 5/1997 | Hagenow et al. | 219/121.71 |
| 5,698,283 | 12/1997 | Yamasaki et al. | 428/43 |
| 5,738,367 | 4/1998 | Zichichi et al. | 280/728.3 |

FOREIGN PATENT DOCUMENTS

| | | |
|---|---|---|
| 63-22262 | 2/1988 | Japan . |
| 2-248238 | 10/1990 | Japan . |
| 4-151345 | 5/1992 | Japan . |
| 6-218811 | 8/1994 | Japan . |

*Primary Examiner*—J. Woodrow Eldred
*Attorney, Agent, or Firm*—Pillsbury Madison & Sutro

[57] ABSTRACT

The air bag cover has a skin layer on the surface side of the cover and a core on the back surface side of the cover. The cover is disposed so as to cover an air bag. The air bag cover has a breakable portion which is broken when the air bag expands. The breakable portion is formed by providing a continuous or intermittent concave portion on the back surface side of the air bag cover. A fragile layer lower in tensile strength than the skin layer is fused to the back surface side of the skin layer.

16 Claims, 4 Drawing Sheets

ID="5,979,931"

AIR BAG COVER

BACKGROUND OF THE INVENTION

1. Field of the Invention

The present invention relates to a motor vehicle air bag cover for covering a folded air bag of an air bag apparatus for use in an instrument panel, a door trim, a seat back, a pad of a steering wheel, etc. More particularly, the present invention relates to an air bag cover made of synthetic resin having a skin layer on the exposed exterior or surface side of the cover and a core or base layer on the back of the surface side, and having a breakable portion which breaks upon deployment of the air bag allowing the air bag to expand and project from the air bag apparatus.

2. Description of the Related Art

An air bag cover has been designed to have a core of synthetic resin and a skin layer disposed on the front surface side of the cover (see Japanese Utility Model Publication No. Sho. 63-22262, for example).

A breakable portion has been formed in the air bag cover which breaks upon deployment of an air bag allowing the air bag to project when the air bag expands. This breakable portion has been provided by forming a concave portion in the air bag cover by a working jig using high-frequency wave, heat, or ultrasonic wave (see Japanese Patent Publication No. Hei. 2-248238, No. Hei. 4-151345, No. Hei. 6-218811).

When a concave portion is provided on the front surface side of the air bag cover, the concave portion detracts from the design of the air bag cover. Thus, the concave portion has been provided on the back surface side. However, it has nonetheless been necessary to provide such a concave portion in the skin layer in order to allow the air bag cover to break smoothly.

However, the thickness of the skin layer of these known covers is so thin (about 1 mm) that it is difficult to control the thickness of the skin layer when the concave portion is formed. The thickness of the skin layer is particularly difficult to control when the air bag cover is curved and the breakable portion must be formed in the curved surface. It has been therefore very difficult to control the thickness of the skin layer.

SUMMARY OF THE INVENTION

It is an object of the present invention to solve the foregoing problems. Accordingly, it is an object to provide an air bag cover, in which a concave portion is not formed on the surface side of the cover, wherein it is unnecessary to control the thickness of the portion of a skin layer positioned in a breakable portion, and wherein this portion of the skin layer can be broken easily when an air bag is deployed.

According to the present invention, an air bag cover for covering an air bag comprises a skin layer having a back surface side; a fragile layer having a back surface side fused to the back surface side of the skin layer; and a core disposed on the back surface side of the fragile layer so that the fragile layer is sandwiched between the skin layer and the core, wherein the core has a concave portion formed in a back surface thereof so as to provide a breakable portion that breaks when the air bag is deployed. The fragile layer is lower in tensile strength than the skin layer.

The air bag cover according to the present invention may further comprise a barrier layer disposed on the back surface side of the fragile layer such that the barrier layer is sandwiched between the fragile layer and the core. The barrier layer protects the skin layer and fragile layer from heat and pressure when the core is injection molded.

Furthermore, the air bag cover may also comprise a foaming layer disposed between the back surface side of the fragile layer and the barrier layer.

In an air bag cover according to the present invention, when an air bag expands, tensile stress is generated and stress concentrates at the breakable portion so that the air bag cover begins to break from the back surface side. Thereafter, the fragile layer, which is lower in tensile strength than the skin layer, begins to break. Since the skin layer is fused to the fragile layer, stress concentrates, by the breaking of the fragile layer, in the portion of the skin layer which has been fused to the breaking portion of the fragile layer. Thus, the skin layer can be broken even if no concave portion is provided in the skin layer.

Therefore, in the air bag cover according to the present invention, even if no concave portion is provided in the skin layer itself, the skin layer can be broken when the air bag expands. Accordingly, it is unnecessary to control the thickness of the skin layer such that a concave portion is provided in the skin layer.

In addition, because it is unnecessary to provide the skin layer with a concave portion on either the front surface side or the back surface side, any concave portion constituting the breakable portion does not appear on the front surface side of the air bag cover, and it is therefore possible to improve the appearance design of the air bag cover.

In addition, in the case where the air bag cover is constituted by a five-layer structure comprising a skin layer, a fragile layer, a foaming layer, a barrier layer, and a core, it is possible to provide a superior feel to the cover by the foaming layer.

DETAILED DESCRIPTION OF THE PREFERRED EMBODIMENTS

An embodiment of the present invention will be described below with reference to the drawings.

Figure 1:
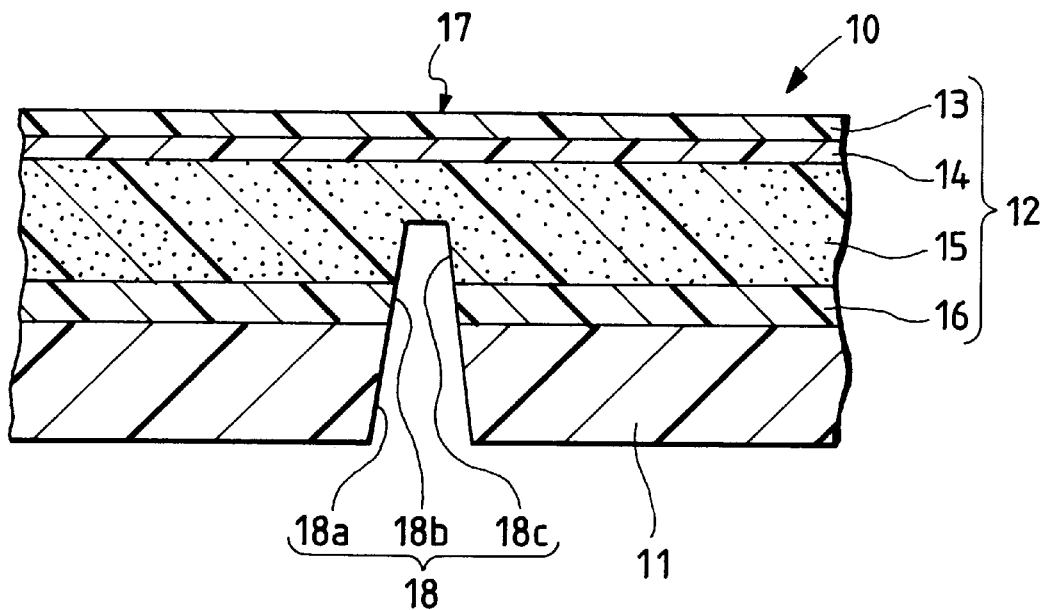
FIG. 1 is an expanded sectional view illustrating a main portion of an embodiment of the present invention.
Figure 2:
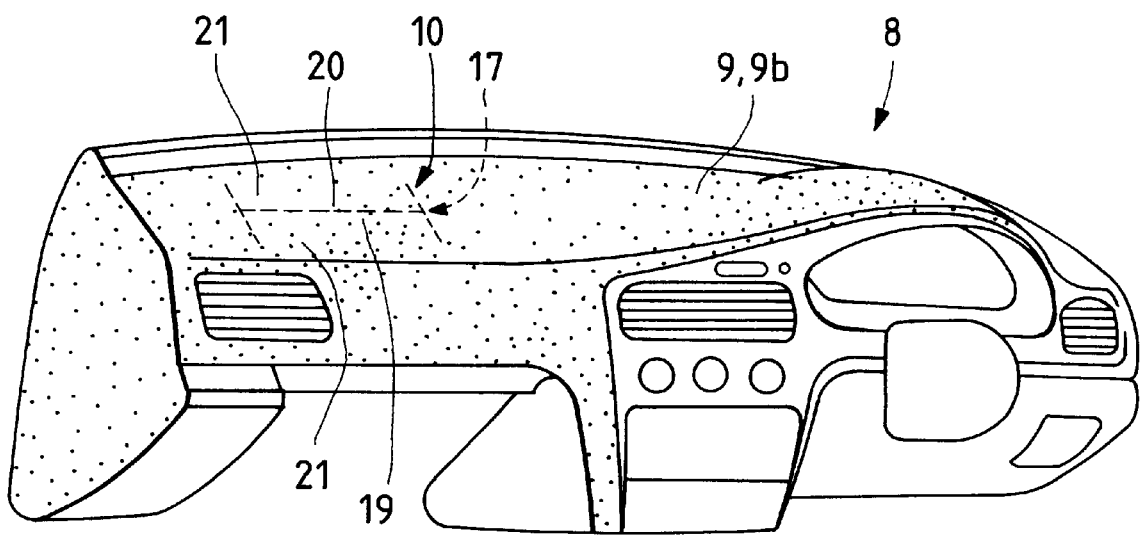
FIG. 2 is a perspective view of the embodiment of FIG. 1.

An air bag cover 10 in this embodiment is formed as a part of an instrument panel 8 of a car. The instrument panel 8 includes an instrument panel body 9 and the air bag cover 10, as shown in FIGS. 1 to 3.

Figure 3:
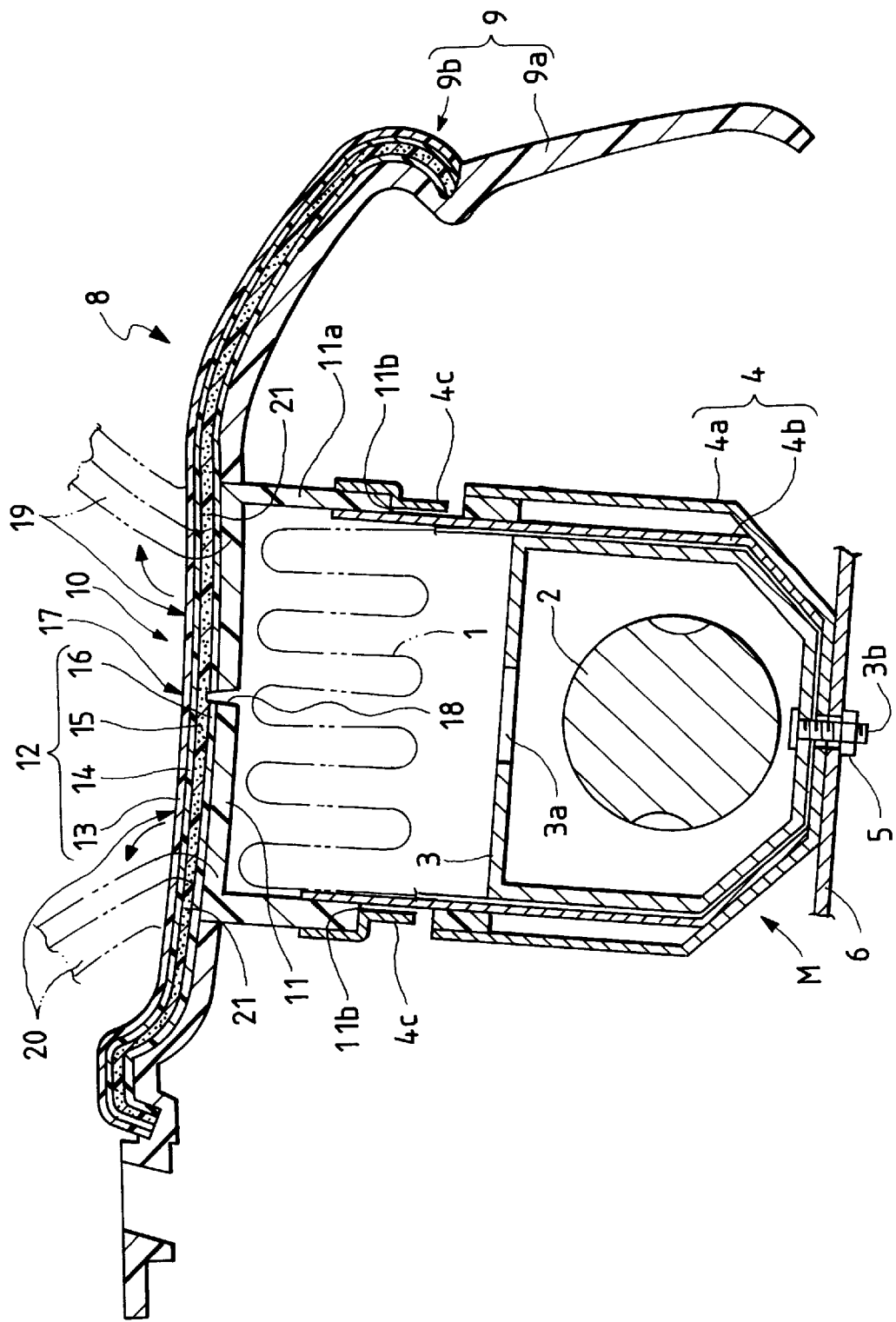
FIG. 3 is a sectional view illustrating a deployed state of the embodiment of FIG. 1.

As shown in FIG. 3, the instrument panel body 9 includes a base 9a of hard synthetic resin such as polypropylene including filler, and a decorative laminate 9b formed by extending a decorative laminate 12, described below. The decorative laminate 12 is disposed so as to cover the base 9a.

The air bag cover 10 is disposed in such a position that the air bag cover 10 covers the upper portion of an air bag 1 of an air bag apparatus M. The cover 10 comprises a core 11 and the decorative laminate 12 disposed on the front surface side of the core 11.

The air bag apparatus M will be described. The air bag apparatus M is comprises the bag-like air bag 1 folded and stored, a cylinder-type inflator 2 for supplying the air bag 1 with expanding gas, a cylindrical diffuser 3 for diffusing the gas from the inflator 2 and making the gas flow into the air bag 1, and a box-like case 4 enclosing the air bag 1, the inflator 2 and the diffuser 3.

The reference numeral 3a represents a gas communication hole through which the gas from the inflator 2 flows into the air bag 1. Reference numeral 3b represents a plurality of bolts which projects over the diffuser 3. These bolts 3b are fixed with nuts 5 so as to integrate the case 4, the air bag 1 and the diffuser 3 with each other, and thereby attach and fix the air bag apparatus M to a bracket 6 provided to project over a frame of a vehicle.

Further, the side wall portion of the case 4 is configured with a double structure including an inner panel 4a and an outer panel 4b. A predetermined number of nails 4c extending from the side of the inner panel 4a are formed in the outer panel 4b. These nails 4c act to lock a bracket 11a which will be described later.

In order to provide the required hinging property of a hinge portions 21, which will be described later, and in order to provide the required bonding strength with the base 9a without using a bonding agent, the core 11 of the air bag cover 10 is formed of thermoplastic elastomer which can be fused to the base 9a. In this embodiment, the base 9a is formed of polypropylene including filler. Olefin thermoplastic elastomer and styrene thermoplastic elastomer, for example, are suitable as the thermoplastic elastomer which can be fused to polypropylene. The core 11 is formed of olefin thermoplastic elastomer in this embodiment.

In addition, the square cylindrical bracket 11a projects over the back surface side of the outer circumferential edge of the core 11. Fitting holes 11b into which the nails 4c of the case 4 are inserted are formed in the bracket 11a so as to lock the core 11 to case 4. This bracket 11a is formed to position a portion of the air bag cover 10 with the case 4 of the air bag apparatus M so that the breakable portion 17 and door portions 19 and 20 are disposed accurately in position above the folded air bag 1.

As shown in FIG. 1, the decorative laminate 12 comprises a skin layer 13 as the front surface side of the cover 10, a fragile layer 14 fused to the back surface side of the skin layer 13, a foaming layer 15 disposed on the back surface side of the fragile layer 14, and a barrier layer 16 disposed on the back surface side of the foaming layer 15. The barrier layer 16 protects the skin layer 13, the fragile layer 14 and the foaming layer 15 from the heat and pressure when the core 11 is injection molded.

In this embodiment, the skin layer 13 is formed of polyvinyl chloride, the fragile layer 14 is formed of the same polyvinyl chloride as the skin layer 13, the foaming layer 15 is formed of foaming polypropylene, and the barrier layer 16 is formed of the same olefin thermoplastic elastomer as the core 11. Both the skin layer 13 and the fragile layer 14 are 0.35 mm thick, the foaming layer 15 is 3.0 mm thick, and the barrier layer 16 is 1.0 mm thick.

Figure 4:
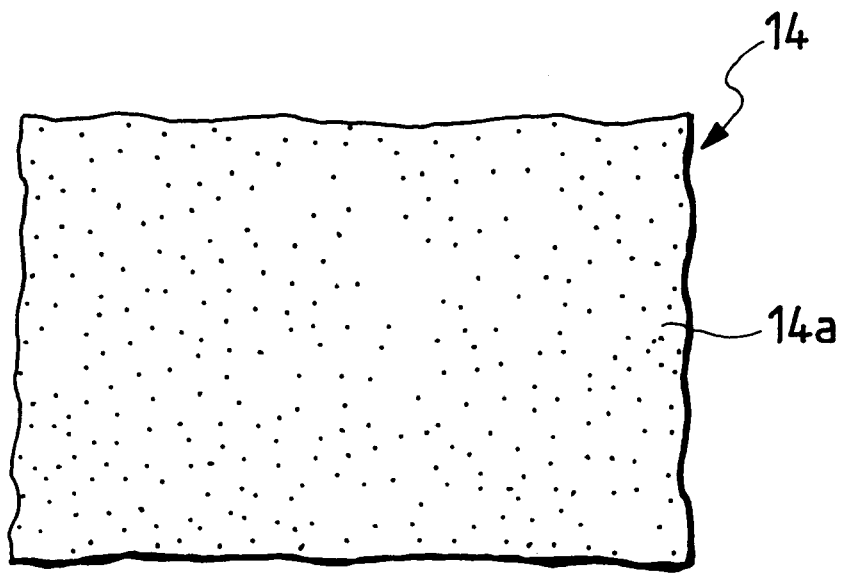
FIG. 4 is a plan view of a fragile layer used in the embodiment of FIG. 1.

The fragile layer 14 is formed of a material which can be fused to the skin layer 12. This material is formed so as to be lower in tensile strength than the skin layer 13. In this embodiment, thin pins having a diameter of about 0.5 mm are pressed into the whole of the fragile layer 14 so as to form a number of pin holes 14a as shown in FIG. 4.

More particularly, in this embodiment, the fragile layer 14 is formed by extrusion molding. Immediately after being extruded out of an extrusion head, the fragile layer 14 is further processed by being pressed by a pin roller having a predetermined number of pins. Then, the fragile layer 14, with the thus formed pin holes 14a, is laid on the skin layer 13 formed by extrusion molding in the same manner as the fragile layer 14. Thereafter, the fragile layer 14 and the skin layer 13 are pressed and fused to each other.

The decorative laminate 12 in this embodiment can be manufactured in such a manner that the back surface side of the fragile layer 14 is coated with a bonding agent, and the fragile layer 14 is bonded with the barrier layer 16 to which the foaming layer 15 has been fused.

The air bag cover 10 is configured so that the breakable portion 17 is disposed in an "H" shape when viewed from above providing two rectangular plate-like door portions 19 and 20 which open when the air bag 1 is deployed. The portions between the upper and lower ends of the "H" shape of the breakable portion 17 act as hinge portions 21 about which the door portions 19 and 20 rotate when those door portions 19 and 20 are opened by an expanding air bag 1.

A concave portion 18 is formed continuously along the breakable portion 17 in the back surface side of the air bag cover 10. This concave portion 18 includes a concave portion (or a cut-off portion) 18a provided in the core 11, a concave portion (or a cut-off portion) 18b provided in the barrier layer 16, and a concave portion 18c provided in the foaming layer 15. The concave portions 18a, 18b and 18c may be formed continuously or intermittently along the breakable portion 17 and serve as a weak portion in which the air bag cover 10 is easily broken compared to the other portions thereof. The concave portion 18c of the foaming layer 15 can be omitted because the foaming layer 15 itself is fragile and has no influence on the breaking of the breakable portion 17 when the air bag 1 expands.

The manufacturing of this air bag cover 10 and the instrument panel 8 will be described below. First, the decorative laminate 12 including the decorative laminate 9b is formed by vacuum molding in a predetermined shape so as to fit onto the instrument panel 8.

Next, the decorative laminates 12 and 9b having the predetermined shaped are set in a mold into which the base 9a of the instrument panel body 9 is molded by injection molding, and the base 9a is formed.

Then, the base 9a and the decorative laminate 12 and 9b, which are fused to each other, are set in an injection mold. The core 11 is formed by injection molding onto the base 9a.

After separation from the mold, the concave portions 18a, 18b and 18c are formed by use of a working hone of an ultrasonic welder. The fitting holes 11b are formed in the bracket 11a of the core 11 by any suitable means. Thus, the instrument panel 8 can be manufactured.

The base 9a, the core 11 and the barrier layer 16 of the decorative laminates 9b and 12 are made of the materials of the same kind or soluble to each other so that they can be fused and bonded with each other firmly without using any bonding agent.

When the instrument panel 8 is coupled with the air bag apparatus M after being manufactured and attached to a vehicle, the bracket 11a is inserted between the inner panel 4a and the outer panel 4b in the case 4 of the air bag apparatus M integrated by use of the respective bolts 3b, and the respective nails 4c are inserted and locked with the fitting holes 11b. At the same time, the bracket 6 is fixed to the respective bolts 3b by the nuts 5, and the other end of the bracket 6 is fixed to a frame of a vehicle (not shown). When the instrument panel 8 is attached to the vehicle, predetermined instruments and so on are disposed therein.

When gas is discharged from the inflator 2 at a predetermined time, the gas flows into the air bag 1 through the gas communication hole 3a of the diffuser 3, and the air bag 1 breaks the breakable portion 17 and opens the door portions 19 and 20, with the hinge portions 21 as rotation centers, so that the air bag 1 deploys over the instrument panel 8.

At the time when the air bag 1 expands, tensile stress is generated in the air bag cover 10, and stress concentrates in the portion where the concave portion 18 is formed on the back surface side in the breakable portion 17, so that the air bag cover 10 begins to break from its back surface side.

The fragile layer 14, which is lower in tensile strength than a skin layer 13, begins to break. Since the skin layer 13 is fused to the fragile layer 14, stress concentrates by the breaking of the fragile layer 14, in the portion of the skin layer 13 that is fused to the breakable portion of the fragile layer 14. Thus, the skin layer 13 can be broken even if no concave portion 18 is provided in the skin layer.

Therefore, in the air bag cover 10 in this embodiment, even if no concave portion 18 is provided in the skin layer 13 itself, the skin layer 13 can be broken in the portion of the skin layer adjacent to the breakable portion 17. Accordingly, it is unnecessary to control the thickness of the skin layer 13 in such a manner that the concave portion 18 is provided in the portion of the skin layer 13 located adjacent to the breakable portion 17. Thus, it is possible to make the skin layer 13 break easily when the air bag 1 expands.

In addition, because it is unnecessary to provide any concave portion in the skin layer 13, either on its front surface side on its back surface side, concave portions do not appear on the front surface side of the air bag cover 10. Accordingly, it is possible to improve the appearance design of the air bag cover 10.

In addition, in the air bag cover 10 in this embodiment, the foaming layer 15 is disposed between the back surface side of the skin layer 13 and the core 11, so that it is possible to provide a superior feel.

The skin layer is thin (0.35 mm thick) and it becomes even thinner when vacuum molding that it provides poor light resistance. However, the fragile layer, which is made of the same material as the outer layer, improves the light resistance.

Although the air bag cover 10 is shown with an "H" shaped breakable portion 17, the shape of the breakable portion 17 is not limited to this shape, and it may, for example, be a "U" shape when viewed from above so that only one door portion is provided.

In addition, although the air bag cover 10 in this embodiment is formed integrally with the instrument panel 8, the air bag cover 10 may also be formed separately from the instrument panel body 9 and installed in a predetermined opening of the instrument panel body 9. Further, an air bag cover according to the present invention can be applied to a door trim, a seat back, a pad of a steering wheel, and so on, which are disposed so as to cover an air bag of an air bag apparatus other than in all instrument panel.

Figure 6:
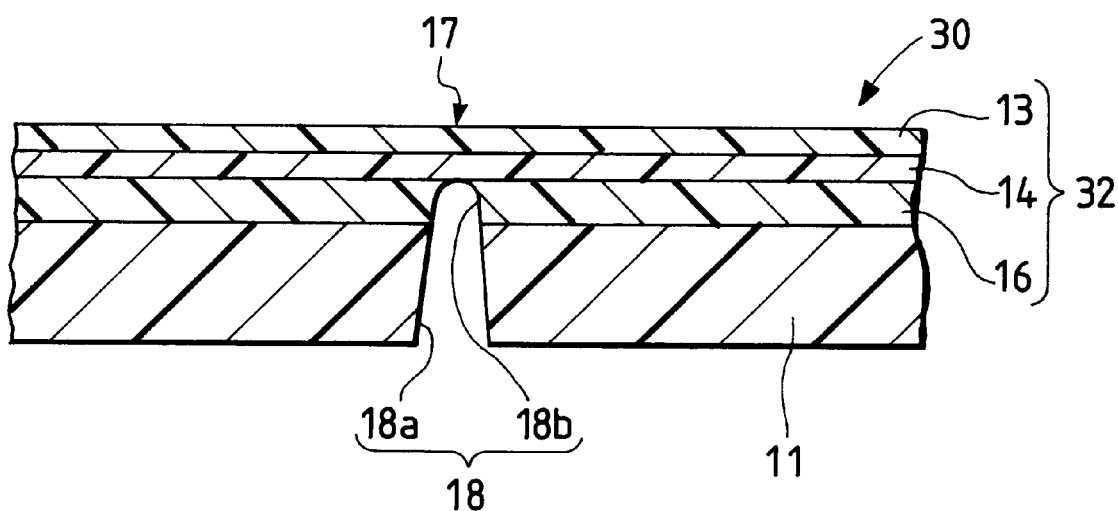
FIG. 6 is an expanded sectional view illustrating a modification of the embodiment of FIG. 1.

Further, although the air bag cover 10 in this embodiment has a five-layer structure including the skin layer 13, the fragile layer 14, the foaming layer 15, the barrier layer 16 and the core 11, the present invention may be applied to an air bag cover 30 having a four-layer structure excluding the foaming layer 15, as shown in FIG. 6. In this air bag cover 30 having the foregoing structure, for example, the fragile layer 14 and the skin layer 13 are made of polyvinyl chloride, and the barrier layer 16 is made of olefin thermoplastic elastomer so that the fragile layer 14 and the barrier layer 16 can not be fused to each other. It is therefore necessary to use a bonding agent, and the barrier layer 16 is bonded to a sheet-like member in which the skin layer 13 and the fragile layer 14 are fused to each other to thereby manufacture a decorative laminate 32. The core 11 is formed on the back surface side of the decorative laminate 32 by injection molding.

If the barrier layer 16 is formed of a material which can be fused to the skin layer 13, it is not necessary to use a bonding agent.

It is also possible to use the barrier layer 16 itself as the fragile layer 14. For example, the skin layer 13 and the barrier layer 16 (now acting as a fragile layer) are made of olefin thermoplastic elastomer so as to be fused to each other as in an air bag cover 40 shown in FIG. 7. Pin holes 14a are formed in the barrier layer 16 in a range of protecting the skin layer 13 at the time of injection molding of the core 11 so that the fragile layer 14 is fused to the skin layer 13. If the core 11 is formed by injection molding on the back surface side of a decorative laminate 42 formed by fusion, the air bag cover 40 can be manufactured. Incidentally, when the skin layer 13 and the fragile layer 14 (barrier layer 16) are bonded in the structure shown in FIG. 7, the layer of a bonding agent interferes with the propagation of breaking to the skin layer 13 at the time of breaking of the fragile layer 14 upon expansion of the air bag, so that the operation and effect of the present invention cannot be obtained.

Figure 5:
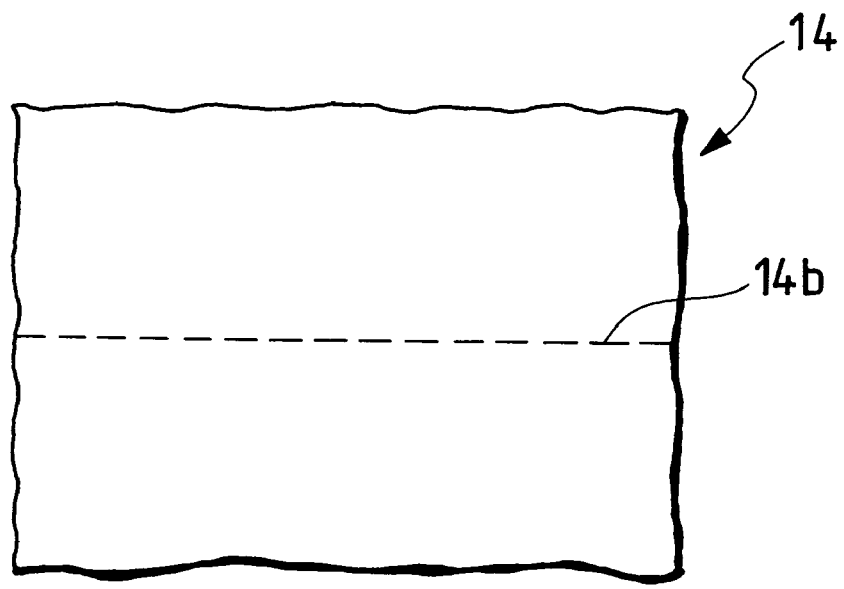
FIG. 5 is a plan view illustrating a modification of the fragile layer used in the embodiment of FIG. 1.

Moreover, in the fragile layer 14, instead of forming the pin holes 14a in the whole surface, slits 14b may be formed correspondingly to the portion where the breakable portion 17 is disposed immediately after extrusion, as shown in FIG. 5. Alternatively, a concave groove may be formed continuously or intermittently in the fragile layer 14 in a portion of the fragile layer 14 corresponding to the breakable portion 17. If the tensile strength of the fragile layer 14 is reduced too much and made as fragile as the foaming layer 15, the fragile layer 14 is not suitable for concentrating the stress to break the skin layer 13. Therefore, preferably, the tensile strength (JIS K6301) is made to be 0.40 to 70% of the skin layer 13, including the establishment of thickness and so on. If it is under 40%, the fragile layer 14 is so fragile that the ability to break smoothly the skin layer 13 is lost. If it exceeds 70%, the tensile strength of the fragile layer 14 is so high that the meaning of providing the fragile layer 14 is lost and it becomes difficult to break the skin layer 13 in the portion of the breakable portion 17.

In addition, the fusion of the skin layer 13 and the fragile layer 14 may be performed, not by extrusion molding, but by ultrasonic welding, dielectric heating, or the like.

Figure 7:
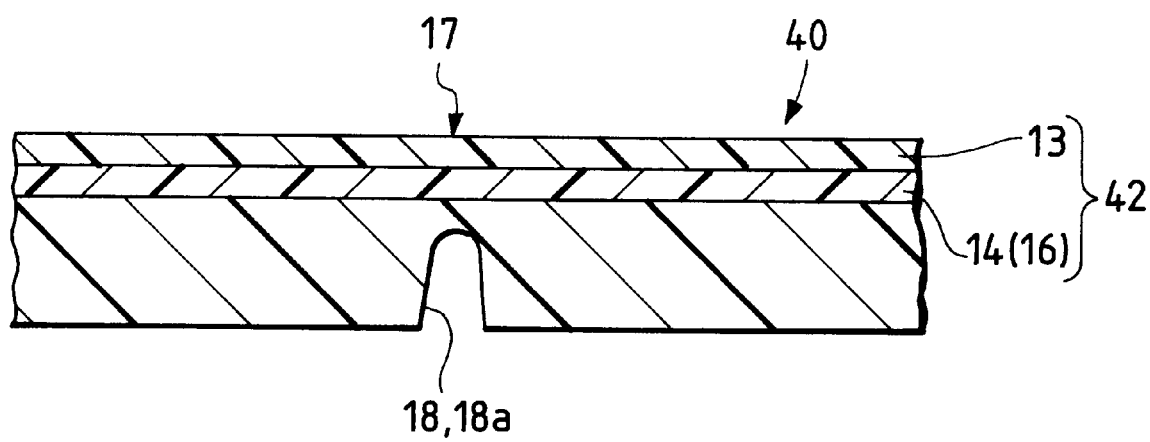
FIG. 7 is an expanded sectional view illustrating another modification of the embodiment of FIG. 1.

Further, in the case where the concave portion 18 (concave portions 18a, 18b and 18c) of the breakable portion 17 is formed, instead of using an ultrasonic welder as in this embodiment, the concave portion 18 may be formed by using a heated cutter, or by using a cutter with high frequency wave, or it may be provided by cutting with a cutter or the like instead of removal by melting. Moreover, when it is not necessary to form the concave portion 18b in the barrier layer 16, the concave portion 18 (18a) may be formed by a means of mold face at the time of injection molding of the core 11 when the core 11 is molded, as shown in FIG. 7.

What is claimed is:

1. An air bag cover for covering an air bag comprising: a skin layer having a back surface side;
a second layer having a back surface side and a front surface side bonded to the back surface side of said skin layer; and
a base layer disposed on the back surface side of said second layer; said base layer having a weak portion formed therein so as to provide a breakable portion which breaks when the air bag expands,
wherein said second layer is lower in tensile strength than said skin layer.

2. The air bag cover according to claim 1, further comprising a barrier layer disposed on the back surface side of said second layer, wherein said barrier layer protects said skin layer and second layer from heat and pressure when said base layer is injection molded onto said skin layer and said second layer.

3. The air bag cover according to claim 2, further comprising a foaming layer disposed between said second layer and said barrier layer.

4. The air bag cover according to claim 1, wherein said base layer is formed of thermoplastic elastomer.

5. The air bag cover according to claim 4, wherein said base layer is formed of one of olefin thermoplastic elastomer and styrene thermoplastic elastomer.

6. The air bag cover according to claim 1, wherein said skin layer and said second layer are formed of polyvinyl chloride.

7. The air bag cover according to claim 3, wherein said foaming layer is formed of foaming polypropylene.

8. The air bag cover according to claim 2, wherein said barrier layer is formed of olefin thermoplastic elastomer.

9. The air bag cover according to claim 3, wherein said skin layer and said second layer are 0.35 mm thick, said foaming layer is 3.0 mm thick, and said barrier layer is 1.0 mm thick.

10. The air bag cover according to claim 1, wherein a plurality of pin holes are formed over a whole surface of said second layer.

11. The air bag cover according to claim 2, wherein said weak portion to provide said breakable portion is formed in said base layer and said barrier layer.

12. The air bag cover according to claim 3, wherein said weak portion to provide said breakable portion is formed in said base layer, barrier layer and foaming layer.

13. The air bag cover according to claim 1, wherein a plurality of slits are formed in said second layer at a portion of said second layer corresponding to said weak portion of said base layer.

14. The air bag cover according to claim 1, wherein a continuous groove is formed in said second layer at a portion of said second layer corresponding to said weak portion of said base layer.

15. The air bag cover according to claim 1, wherein an intermittent groove is formed in said second layer at a portion of said second layer corresponding to said weak portion of said base layer.

16. The air bag cover according to claim 1, wherein a tensile strength of said second layer is between 40 and 70% of a tensile strength of said skin layer.

* * * * *